INVENTOR.
Walter A. Barr
BY Jesse P. Langley
ATTORNEY

Feb. 20, 1934.   W. A. BARR   1,948,094
AUTOMATIC CONTROL SYSTEM FOR GAS MAKING APPARATUS
Filed Feb. 23, 1928   6 Sheets-Sheet 5

INVENTOR.
Walter A. Barr
BY Jesse R. Langley
ATTORNEY.

Patented Feb. 20, 1934

1,948,094

UNITED STATES PATENT OFFICE 1,948,094

AUTOMATIC CONTROL SYSTEM FOR GAS-MAKING APPARATUS

Walter A. Barr, Fort Wayne, Ind., assignor to The Western Gas Construction Company, a corporation of Indiana Application February 23, 1928. Serial No. 256,110

4 Claims. (Cl. 48—83)

My invention relates to gas-making apparatus such as water-gas sets and more particularly to means for controlling the operating valves of water-gas manufacturing units and for operating them in a definite, uniform and predetermined sequence. My invention further relates to means for co-ordinating operation of a plurality of water-gas manufacturing units.

The manufacture of water gas is carried out in sets comprised of generators and allied apparatus that is necessarily or conveniently somewhat limited in size, so that gas demands of large volume are met by operating a plurality of such machines or sets. It is highly desirable, and especially where the water gas is to be used in some chemical process, for example the manufacture of methanol or a hydrogenation process, that the gas make of such a plurality of gas-making units be as uniform as possible. By reason of the fact that a water-gas set does not continuously make usable gas, since gas-making periods must be alternated with heating periods, and also by reason of the fact that water-gas sets must occasionally be shut down for clinkering, re-checkering, or other repairs, and for other reasons known to those skilled in the art, it has been impossible in the past to accomplish a uniform evolution of water gas from a group of gas-making units.

An object of the present invention is to provide apparatus for manufacturing large quantities of water gas at a more uniform rate than has heretofore been attainable.

A further object of the present invention is to provide means for effecting uniform operation of a plurality of water-gas generating units.

In addition to the general objects recited above, my invention has for further objects such other improvements and advantages in construction and operation as may be found to obtain in the structures and devices hereinafter described and claimed.

My invention is particularly adapted to be embodied in conjunction with automatic hydraulic control apparatus for operating and controlling the valves of a water-gas set, and is so specifically described and illustrated hereinbelow, but is not limited to such specific application.

Such control apparatus is preferably that described and claimed in U. S. Letters Patent No. 1,671,093, granted May 22, 1928 to Thos. W. Stone, and more particularly the more recent modification and improvement described and claimed in U. S. Letters Patent No. 1,670,911, granted May 22, 1928 to Thos. W. Stone and Walter A. Barr.

The valves of the water-gas set, each of which is provided with a motive device such as a hydraulic cylinder, are controlled and caused to be operated in a definite sequence by means of liquid pressure from a hydraulic master cylinder. This master cylinder is, in turn, controlled and operated by means of a timing device actuated by fluid pressure and which is capable of operating the master cylinder through a cycle any portion of which may be increased or decreased, with respect to time, at will and according to the results desired. Such control apparatus has important advantages and utilities and has attained wide-spread commercial use.

In order that my invention may be clearly set forth and understood, I now describe the manner in which it is embodied and practiced with reference to the accompanying drawings, forming a part of the specification and showing a preferred form and manner in which the invention may be embodied and practiced but without limiting my invention to such illustrative instance or instances.

In the drawings.

Similar characters of reference designate similar parts in each of the several views of the drawings.

Figure 1:
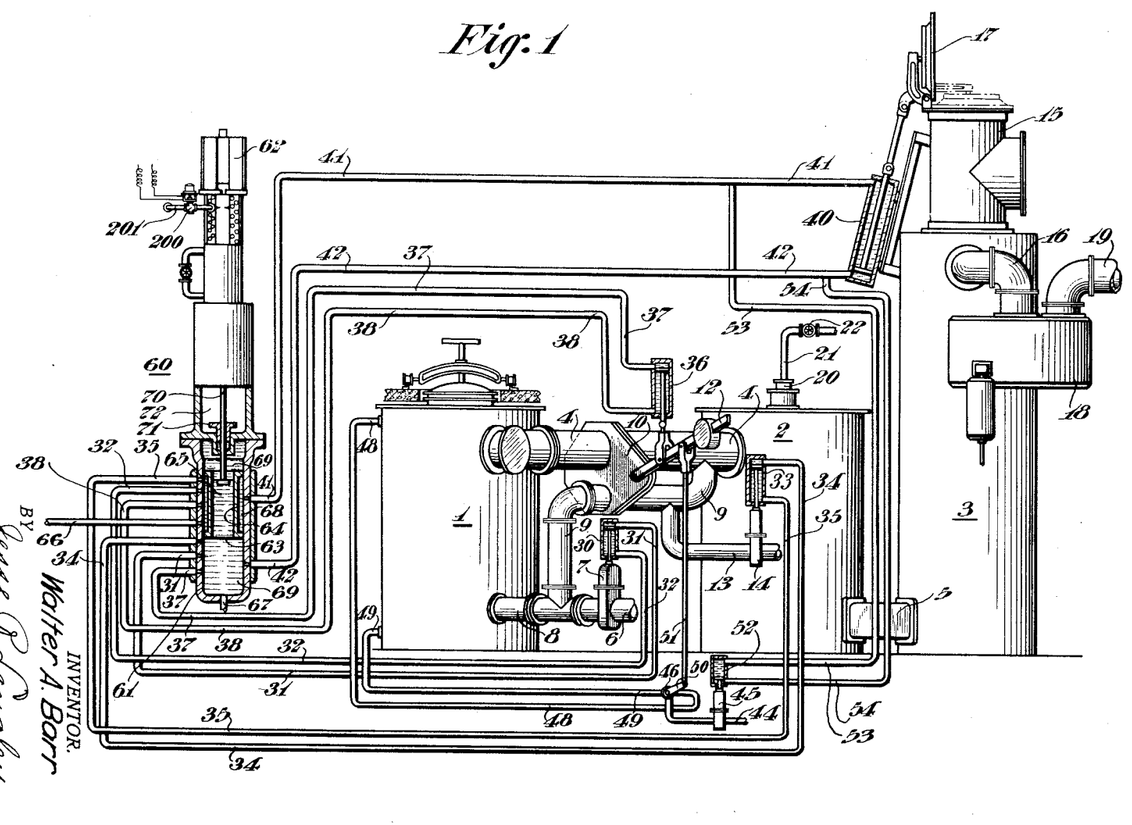
Figure 1 is a view partially in elevation and partially in vertical section of a carburetted water-gas set, with the various interconnections, fluid supply means and valves, and including means for controlling and operating said valves, parts being more or less diagrammatically represented.

Referring to the drawings and more particularly to Fig. 1, a single water-gas set comprises a water-gas generator 1, a carburetter 2, and a superheater 3, that are provided with the usual interconnections, fluid supply means, control means and the like. A fuel bed is supported within the interior of the generator 1, and the interiors of the carburetter 2 and superheater 3 are filled with checkerbrick in the usual manner. A conduit 4 provides communication between the upper portions of the generator 1 and carburetter 2, respectively, and a conduit 5 provides communication between the lower portions of the carburetter 2 and superheater 3. An air supply conduit 6 that is provided with a generator blast valve 7 communicates, through a branch 8, with the lower portion of the generator 1, and through a branch 9, and a portion of the conduit 4 with the upper portion of the carburetter 2.

In the present instance, a hot valve 10 is provided which intersects conduits 4 and 9. This hot valve 10 is provided with a gate (not shown) that is effective to close off either conduit 4 or conduit 9 and which is operated by means of a lever 12. In Fig. 1, the lever 12 is shown in its upper or raised position in which conduit 9 is closed at the intersection of the hot valve 10 and conduit 4 is open. This is the normal position of the hot valve. A carburetter blast or secondary air line 13 that is provided with a valve 14 communicates with the conduit 9 between the hot valve 10 and the upper part of the carburetter 2.

The upper part of the superheater 3 is provided with outlets 15 and 16. The outlet 15 communicates through a stack valve 17 to the atmosphere or stack and the outlet 16 leads into a water-sealed wash-box or tar batter 18 that is, in turn, provided with an outlet conduit 19 leading to the gas-purifying and distributing system (not shown).

The carburetter 2 is provided at its upper portion with an oil spray 20 that is supplied with oil from a supply line 21 having a valve 22 therein. Although this valve is shown as of manually-operated type, it may be hydraulically operated and automatically controlled, as may any other valves incident to the operation of the water-gas set, including not only the valves shown in the drawings but any other valves, such as blower steam valves, charging machine valves, and the like (not shown).

The generator air blast valve 7 is operated by a hydraulic cylinder 30 that is provided with hydraulic pressure and relief lines 31 and 32 for effecting the opening and closing of the valve 7 according to whether pressure is applied through line 32 while line 31 is connected to a drain line, or vice versa. Oil or water or other liquid may be employed in the hydraulic cylinder.

The carburetter air blast valve 14 is controlled by a similar hydraulic cylinder 33 that is provided with hydraulic pressure and relief lines 34 and 35 which communicate with the upper and lower ends of the cylinder 33, respectively, and are effective to open and close the valve 14. The hot valve 10 is provided with a hydraulic operating cylinder 36 that is pivotally secured to the lever 12 and which is provided with hydraulic pressure and relief lines 37 and 38 which communicate with the upper and lower ends of the cylinder 36, respectively.

The stack valve 17 is provided with a hydraulic cylinder 40 that is effective to open and close the valve 17 and which communicates at its upper and lower ends with hydraulic pressure and relief lines 41 and 42, respectively. The lines 41 and 42 in part also serve to operate the valve which controls the supply of steam to the generator.

Steam is supplied from a steam line 44 having a steam valve 45 therein, sometimes known as the "off-and-on-steam-valve". The steam line 44 communicates through a 3-way reversing valve 46, known as the "up-and-down-run valve" with conduits 48 and 49 which communicate with the upper and the lower portions of the generator 1, respectively. The reversing valve 46 has a lever arm 50 that is operated by means of a rod 51 that is attached at its other end to the lever arm 12 of the hot valve 10. The reversing valve 46 is so disposed that with the lever arms 12 and 50 in their raised positions, corresponding to the normal or uprun position of the hot valve 10, communication between conduits 44 and 49 will be open and communication between conduits 44 and 48 will be cut off, steam entering the lower part of the generator 1. When the cylinder 36 operates to lower the lever 12 and reverse the hot valve, the valve 46 will also be reversed and communication between conduits 44 and 48 will be established and communication between conduits 44 and 49 will be terminated, steam now entering the upper part of the generator 1.

The steam valve 45 is provided with a hydraulic cylinder 52, the upper and lower portions of which communicate with hydraulic pressure and relief conduits 53 and 54, respectively. The conduits 53 and 54 communicate at their other extremities with conduits 41 and 42, respectively. This arrangement provides for the opening of the steam valve 45 simultaneously with the closing of the stack valve 17, and vice versa.

For controlling and operating the various valves 7, 10, 14, 17 and 45 and any other valves of this water-gas set and related apparatus, there is provided a corresponding automatic control apparatus, indicated generally at 60, and comprising a master cylinder 61 and a timer 62. Within the cylinder 61 is situated a piston valve 63 that is somewhat of spool shape. The piston valve 63 slidably engages the cylinder 61 at its upper and lower ends and is provided with a central portion 64 of restricted diameter and a coaxial central conduit 65, extending therethrough and providing communication between the portions of the interior of the cylinder 61 above and below the piston valve 63, whereas that portion of the interior of the cylinder 61 opposite to the restricted portion 64 of the piston valve 63 is not in communication with said portions of the interior of the cylinder 61 that are above and below the piston valve 63.

Midway of the cylinder 61 and of the path of travel of the piston valve 63, there is provided a port communicating with a hydraulic pressure conduit 66. A hydraulic relief conduit or drain line 67 is provided in the base of the cylinder 61. The up and down travel of the piston valve 63 is so regulated that the port communicating with the conduit 66 is always between the upper and the lower ends of the piston valve 63. Consequently, that portion 68 of the interior of the cylinder 61 corresponding to the outer annular recess 64 of the piston valve 63 is always a high-pressure zone and the remaining portions of the interior of the cylinder 61 (i. e., the portions of the interior not occupied by the piston 63 or the high-pressure zone), being in communication with the drain line 67, always constitute a low-pressure zone 69.

The various hydraulic pressure and relief conduits 31, 32, 34, 35, 37, 38, 41 and 42, which serve to conduct water to and from the hydraulic cylinders of the various valves of the water-gas set, communicate with the interior of the master cylinder 61 through corresponding ports in the sides thereof. These ports are arranged according to the desired sequence of operation of the corresponding water-gas set operating valves. Each pair of conduits 31 and 32, 34 and 35 and the like, communicates with a pair of ports in the sides of the master cylinder 61 that are arranged at such distance from each other that when the piston valve 63 is in such position as to expose one of each pair to the high-pressure zone 68, the other port of that pair will be in communication with the low-pressure zone 69 leading to the drain line 67 and vice versa; that is, one series of ports corresponding to one of each of the pairs of conduits and comprising conduits 32, 35, 38 and 41 communicate with the cylinder 61 above the pressure conduit 66 and a corresponding and similarly arranged series which comprises conduits 31, 34, 37 and 42 communicate with the cylinder 61 below the conduit 66.

It will be apparent that, as the piston valve 63 moves into such position as to expose to the high-pressure zone 68 one of the conduits leading to any of the hydraulic cylinders of the valves, the other conduit leading to the same hydraulic cylinder will be exposed to the low-pressure zone, 69, thus operating the valve in one direction which may be either to close or to open or to reverse it. When the piston valve 63 is reversed and again moves past this pair of conduits, the high-pressure and the low-pressure conditions will be reversed and the hydraulic cylinder will reverse the position of the valve controlled by this pair of conduits and again reverse or open or close the valve.

In the present instance, as shown in Fig. 1, the piston valve 63 is shown at a point somewhat below the extreme upper limit of its travel, that is, shortly after a down-stroke has commenced. In this position, the entire upper series of conduits 32, 35, 38 and 41, as well as conduit 53 are in communication with the high-pressure zone. This corresponds to that point in the cycle of water-gas manufacture which represents the latter part of the air blow period.

During this period, the air blast enters the bottom of the generator 1, passes upward through the incandescent fuel bed therein, raising the temperature of the same and generating producer gas which passes through conduit 4 into the carburetter 2 and is burned by a secondary air blast admitted through conduits 13 and 9. The sensible heat and heat of combustion of the balst gases are utilized to raise the temperature of the checkerwork within the carburetter 2 and superheater 3 and the resultant products of combustion are passed through the outlet 15 and the open stack valve 17. It will be noted that valves 7, 14 and 17 are open, valve 45 is closed and the hot valve 10 is in the normal or uprun position.

Upon further downward travel, the piston valve 63 closes valve 14, shutting off the secondary air; closes valve 7, shutting off the primary air or blast; and then closes the stack valve 17 and opens the steam valve 45, thus entering the "run" period of the gas-manufacturing cycle. For convenience, the beginning of the run will herein be considered as the commencement of the cycle of operation, although it is not generally so regarded. Steam then flows through conduits 44 and 49 into the lower portion of the generator 1 and, passing through the incandescent fuel bed, generates blue water gas. This gas passes through conduit 4 into the carburetter 2, where it is carburetted by means of oil introduced through the spray 20, thence into the superheater 3, and the thus carburetted and fixed gas flows from the superheater 3 through the outlet 16 into the tar batter 18, and then through conduit 19 into the purification and distribution system, which is not shown.

In modern carburetted water-gas practice, it is found desirable to reverse the direction of the steam through the generator during a portion of the "run" period. This is known as a "split run" and reversal of flow of steam through the generator is accomplished when the piston valve 63 moves further downward in its travel and exposes the port 37 to the high-pressure zone 68. The hot valve 10 is then reversed and with it the reversing valve 46. Steam now flows through the conduit 48 into the upper part of the generator, downward through the fuel bed therein and passes through conduits 8 and 9 into the carburetter 2, the remainder of its travel being similar to the travel of the gases during the uprun. Or, as in some of the more recent cycles that have been adopted in the art, the down-run blue water gas is led directly from the bottom of the generator 1 to the tar batter 18, through a so-called "by-pass" or "back-run" connection, which is not shown.

The downrun continues until the piston valve 63, having completed its downward stroke, reverses and starts upward. During its upward stroke, the piston valve 63 again operates the hot valve 10 into the normal position, thereby again reversing the valve 46, thus resuming the up-run and subsequently opens the stack valve 17, turns off the steam and turns on the air blast, thus entering a new blow period which completes the cycle. It will be seen that the sequence of operation of the water-gas set operating valves is invariable, although various devices may be employed to change the sequence slightly in the up- and-down strokes, respectively, when special modes of operation, such as "purge-runs" and "blow-runs" are desirable. Such devices are not, however, a part of the present invention and need not be described herein.

The piston valve 63 is rigidly attached to a connecting rod 70, which passes through a gland 71 and an intermediate chamber 72 into the upper portion of the automatic control apparatus 60 and terminates at its upper end in the timing mechanism 62.

Figure 2:
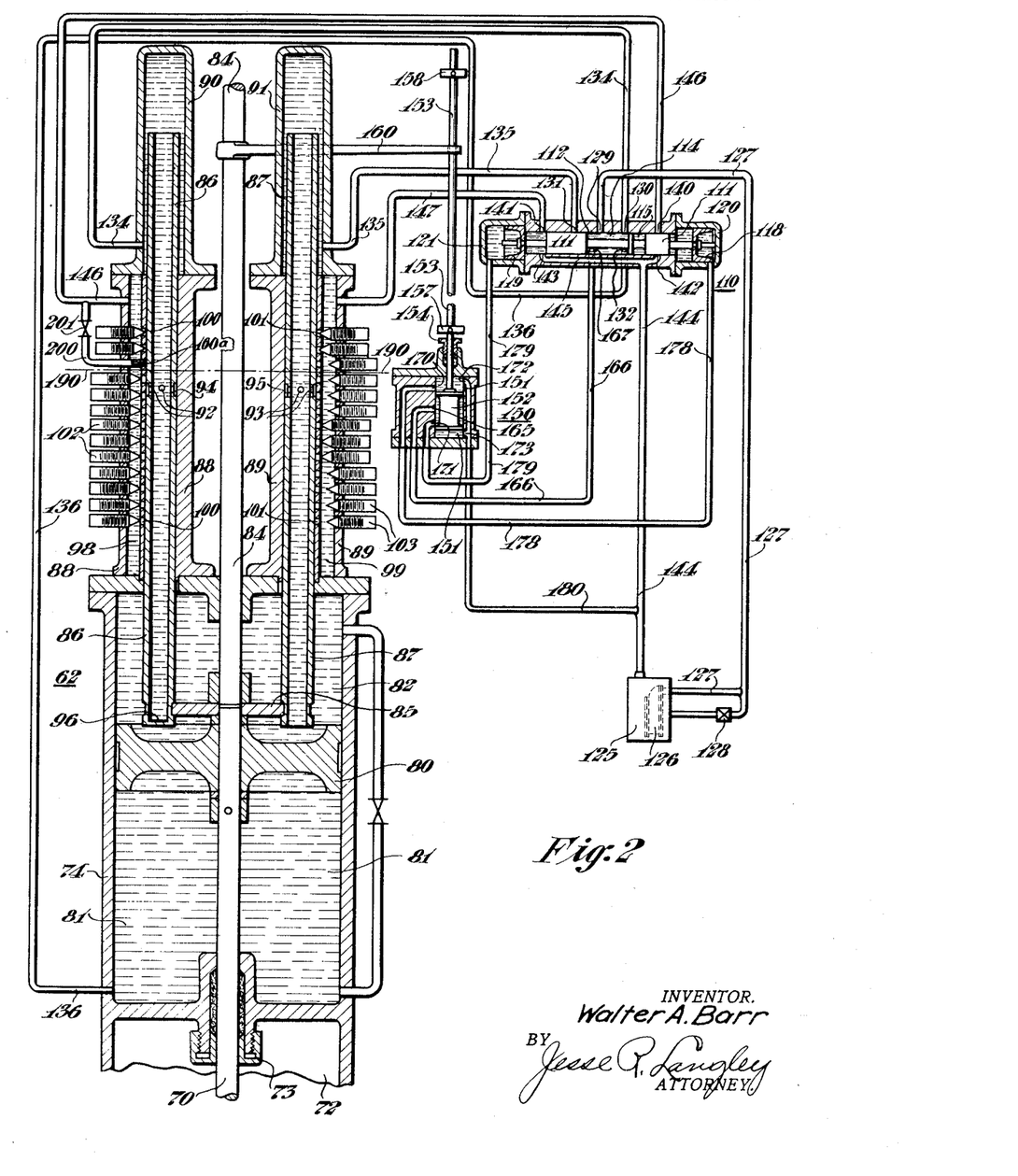
Fig. 2 is an enlarged vertical sectional view, more or less diagrammatical, of a portion of the controlling means of Fig. 1, and of means for actuating, reversing and delaying the operation of said means.

The timing mechanism 62 is shown more or less diagrammatically and in detail in Fig. 2. Referring to this view, it will be noted that the connecting rod 70 passes through a gland 73 into a closed cylinder 74 and is rigidly fastened to a piston 80 slidably mounted therein. The piston 80 is adapted to be moved up or down within the cylinder 74 by pressure applied to the lower portion 81 or the upper portion 82 thereof, respectively. It will be apparent that the travel of the piston 80 controls the stroke of the piston valve 63 shown in the previous figure.

The connecting rod 70 is provided at its upper end with an extension 84 which passes through the upper end of the cylinder 74. A cross-head 85 secures to the piston 80 two hollow stems 86 and 87 that extend upward through the upper end of the cylinder 74 and through a pair of sleeve-like housings 88 and 89, respectively. The housings 88 and 89 are of such diameter as to constitute a sliding fit with the stems 86 and 87. Mounted above the housings 88 and 89 are a pair of capped cylinders 90 and 91, respectively, of somewhat larger diameter than the stems 86 and 87. The interior of the cylinders 90 and 91 are in communication with the interiors of the stems 86 and 87.

The entire system, including pilot and reversing valves to be described hereinbelow, is completely filled with a liquid, preferably oil.

The stems 86 and 87 are each provided approximately midway of their length with a plurality of ports 92 and 93, respectively, which, in turn, communicate with respective grooves 94 and 95 that are recessed in the outer walls of the stems 86 and 87.

The left-hand stem 86 is sealed at its lower end by a cap 96, which prevents communication between the interior of the cylinder 90 and the upper portion 82 of the interior of the cylinder 74. The cylinder 91 and the space 82 are always in free communication by reason of the fact that the stem 87 is open throughout its entire length and at both ends thereof.

The housings 88 and 89 are provided with vertical passages 98 and 99, extending through their entire length and which are, in turn, provided with pluralities of ports 100 and 101, respectively. The ports 100 and 101 are adjacent to the stems 86 and 87 and are so spaced that the grooves 94 and 95 passing up or down just open one corresponding pair of said ports 100 and 101 as the adjacent ports in each housing are closed.

The ports 100 and 101 are provided with needle valves 102 and 103, respectively, adjustably mounted in such manner as to be effective to restrict or enlarge the effective orifice area of the corresponding ports 100 and 101. The function of the area of the ports 100 and 101 is to control the rate of travel of the stems 86 and 87 and piston 80, as will be described hereinbelow.

For controlling the operation of the piston 80, there is provided a reversing valve 110. A slide 111 is slidably mounted in an inner cylindrical chamber 112 of the reversing valve 110. The slide 111 is provided about midway of its length with a relatively wide groove or recess 114 and also with a relatively narrow groove 115 at a short distance therefrom. The slide 111 is held in position and caused to move back and forth by pressure selectively applied to a pair of right- and-left-hand pistons 118 and 119, which are slidably mounted in a pair of slightly enlarged capped cylinders 120 and 121, mounted over the right- and the left-hand ends, respectively, of the valve 110.

A liquid, preferably an oil, is maintained throughout the system, emanating from within a chamber 125 containing a positive pressure pump 126. Oil under pressure is forced by this pump through a conduit 127, (constant pressure being maintained by means of a pressure-regulating valve 128 situated thereon) into the cylinder 112, through a port 129, situated about midway of the length of said cylinder. This port is so located with respect to the slide 111 that the grooved portion 114 of the slide 111 is always opposite the port 129. Consequently, that portion of the interior of cylinder 112 corresponding to the grooved portion 114 of the slide 111 always constitutes a high-pressure zone.

The cylinder 112 is further provided with a pair of ports 130 and 131, equally and oppositely spaced from the port 129 at a distance less than the width of the grooved portion 114 of the slide 111. It will be apparent from the description that when the slide 111 is in the extreme right-hand position as shown in Fig. 2, the port 130 will be exposed to the high-pressure zone and the port 131 will be shut off by the slide 111, whereas, when the side 111 is in the extreme left-hand position, the port 131 will be exposed to the high-pressure zone and the port 130 will be uncovered by the grooved portion 115 of the slide 111.

The port 130 is then in communication through the grooved portion of the slide 111 with a port 132 situated in the side of the cylinder 112 at a point opposite to the port 130. The ports 130 and 131 communicate through conduits 134 and 135 with the cylinders 90 and 91, respectively, and the port 132 communicates through a conduit 136 with that portion 81 of the cylinder 74 below the lowermost point of travel of the piston 80.

Another pair of ports 140 and 141 equally and oppositely spaced from the port 129 are provided in the sides of the cylinder 112 at such distance from the port 129 as to insure that, when one of said ports is closed by the slide 111, the other will be uncovered thereby. In Fig. 2, the slide 111 being in the right-hand position, the port 140 is closed and the port 141 is open. Opposite to the ports 140 and 141 are located a pair of ports 142 and 143, respectively, that communicate with a low-pressure conduit 144 through a common conduit 145 in the wall of the reversing valve 110. The conduit 144 also communicates with the oil chamber 125.

The ports 140 and 141 communicate through a corresponding pair of conduits 146 and 147 with the passages 98 and 99 within the walls of the sleeves 88 and 89, respectively. It will be apparent that, in the right-hand position of the slide 111 (as shown in Fig. 2) oil is free to flow from passage 99 through conduit 147, the interior of the cylinder 112, port 143, and conduits 145 and 144 into the oil chamber 125 that is maintained under low pressure, while at the same time communication between passage 98 and the oil chamber 125 is interrupted by the slide 111 at port 140.

It will further be apparent that, when the slide 111 is moved into the left-hand position, these conditions will be reversed, i. e., communication between passage 99 and the oil chamber 125 will be interrupted and communication between the passage 98 and the oil chamber 125 will be established.

In order to describe the mechanism provided to reverse the timing device 62 at the end of an up- or-down-stroke of the piston 80, it is first necessary to describe the operation of the stems 86 and 87 and piston 80 during such a stroke. In Fig. 2, the piston 80 is represented as having completed about two-thirds of an up-stroke. (This does not, however, correspond with the position of the piston valve 63 as shown in Fig. 1, but has been assumed for purposes of simplification and explanation.) High-pressure oil from the pump 126 is flowing through conduit 127, port 129, the high-pressure zone corresponding to the grooved portion 114 of the slide 111, port 132 and conduit 136 into the lower portion 81 of the interior of the cylinder 74.

Pressure is thus exerted against the lower side of the piston 80, tending to force the piston 80 upward. In order for piston 80 to move upward, the oil confined within the upper portion 82 of the interior of the cylinder 74 must be released. The conduit 135 leading from the cylinder 91 is now sealed off at port 131 by the valve 111. Consequently, this oil flows through the right-hand stem 87, through ports 93 into the groove 95, and escapes through ports 101 at a rate corresponding to the effective orifice area of that port 101, which is in communication with the groove 95.

As the orifices 101 are controlled by the needle valves 103, it will be apparent that the rate at which the piston 80 moves upward will be determined by the settings of the needle valves 103 and that to vary the position of any of said needle valves 103 is to vary the rate of movement of the piston 80 over the corresponding portion of the upstroke.

More specifically, moving any needle valve 103 away from its corresponding port 101 increases the speed of flow through the groove 95, the piston 80 and the piston valve 63 at that point in the stroke.

The oil flowing from the groove 95 through the corresponding port 101 into the passage 99 passes through the conduit 147 and port 141 across the cylinder 112 and escapes through port 143 and conduits 145 and 144 into the low-pressure zone within the oil chamber 125.

During the up-stroke, an outlet must also be provided for the oil within the interiors of the stem 86 and cylinder 90, and this is provided as will now be shown. This oil flows from cylinder 90 through conduit 134 and port 130 into the high-pressure zone corresponding to the grooved portion 114 of the slide 111. The fact that the oil will flow in this direction toward a high-pressure zone is due to the difference in cross-sectional areas of the piston 80 and the capped stem 86. With the same oil pressure in pounds per square inch exerted upon each, the effective pressure in pounds against the lower side of the piston 80 is much greater than the effective downward pressure in pounds on the stem 86 and cap 96 plus the pressure of the oil confined above the piston 80 and consequently the piston 80 moves upward and oil is forced from the cylinder 90 through conduit 134 into the high-pressure zone within the valve 110. During the upstroke, oil will not be permitted to flow through the ports 92, the groove 94, and ports 100 into the passage 98 by reason of the fact that the slide 111, while in the right-hand position corresponding to the up-stroke, seals off the conduit 146 leading from the passage 98, and prevents outflow of the oil confined therein.

To reverse the direction of stroke of the piston 80, it is only necessary to move the slide 111 into the left-hand position. For this purpose, I provide a pilot valve, indicated generally at 150. This valve is provided with an inner cylindrical chamber 151, wherein is mounted a spool-shaped slide 152. The slide 152 is actuated by means of a vertical rod 153, which passes through a gland 154 in the body of the pilot valve 150. The rod 153 is further provided with a collar 157 at a point near the body of the pilot valve 150 and a further collar 158 located above the collar 157 and at a distance therefrom which is slightly less than the length of stroke of the piston 80. Mounted upon the extension rod 84 of the timer 62 is an arm 160, the end of which is free to move up or down along the rod 153.

The collars 158 and 157 are so situated with respect to the arm 160 that, when the piston 80 reaches the top of its stroke, the arm 160 will engage the collar 158 and cause the rod 153 to move upward a distance corresponding to the free travel of the slide 152, and also when the piston 80 reaches the end of the downstroke, the arm 160 will engage the collar 157 then in its raised position and will lower the rod 153 and slide 152 into the lowermost positions of their free travel, in which they are shown in Fig. 2.

Midway of the travel of the slide 152 and of the cylinder 151 there is provided a port 165 that communicates through a conduit 166 with a port 167, so located in the side of the cylinder 112 of the valve 110 that port 167 will always be exposed to the high-pressure zone corresponding to the grooved portion 114 of the slide 111. In the side of the cylinder 151 and equally and oppositely spaced from the port 165 are a pair of ports 170 and 171. Ports 170 and 171 are so spaced from the port 165 that, when the slide 152 is in its upper position, the port 170 will be exposed to the high-pressure zone corresponding to the restricted portion of the slide 152, whereas, with the slide 152 in its lower position (as shown), the port 171 will be exposed to the high-pressure zone.

Also equally and oppositely spaced from the port 165 are a pair of ports 172 and 173 at a greater distance from port 165 than are the ports 170 and 171 and being so positioned that the ports 172 and 173 will always be situated above and below the slide 152, respectively, regardless of whether the slide 152 is in its upper or its lower position. The ports 170 and 171 communicate through conduits 178 and 179 with the right and left-hand cylinders 120 and 121, respectively, and ports 172 and 173 both communicate with a conduit 180, which further communicates with conduit 144 leading back to the low-pressure zone within the oil chamber 125.

In Fig. 2, as noted above, with the piston 80 in the course of an up-stroke, the slide 152 is in the lower position, having been placed in that position at the end of the preceding down-stroke. Oil from the high-pressure zone corresponding to the grooved portion 114 of the slide 111 flows through port 167, conduit 166 and port 165, passing through the high-pressure zone within the pilot valve 150 into port 171, through the conduit 179 and into the left-hand cylinder 121. Force is thus exerted upon the piston 119 which tends to move it to the right, and to maintain the slide 111 in is right-hand position, in which it is shown. The oil within that portion of the cylinder 120 that is to the right of the piston 118 is released through conduit 178 and port 170, flowing through the low-pressure zone of the cylinder 151, through port 172 and conduits 180 and 144 to the low-pressure zone within the chamber 125.

When the piston 80 rises to a point near the end of its stroke, the arm 160 engages and lifts the collar 158, and the slide 152 rises into the upper position. High-pressure oil is now directed against the right-hand face of the piston 118, moving the piston 118, the slide 111 and the piston 119 to the left and the oil confined within the cylinder 121 is released, flowing through the conduit 179 into the low-pressure area zone within the pilot valve 150.

With the slide 111 now in the left-hand position, oil from the high-pressure zone corresponding to the grooved portion 114 of the slide 111 flows through port 131 and conduit 135 into the interior of the cylinder 91, through the interior of the stem 87 and into the upper portion 82 of the interior of the cylinder 74, exerting a downward pressure against the upper side of the piston 80. No oil escapes through the port 93 into the passage 99 by reason of the fact that the conduit 147 is now sealed off at the port 141 by the slide 111.

The oil confined within the lower portion 81 of the interior of the cylinder 74 passes through conduit 136, port 132, around the grooved portion 115 of the slide 111, into port 130, through conduit 134 into the interior of the cylinder 90, and through the interior of the stem 86 through ports 92 into groove 94. The oil escapes from the groove 94 through the ports 100 into passage 98 and thence through conduit 146 and port 140 across the interior of the cylinder 112 into port 142 and passes through conduit 144 into the low-pressure zone of the oil chamber 125.

When the piston 80 reaches the end of the down-stroke, the arm 160 engages the collar 157, lowers the slide 152 of the pilot valve 150, which, in turn, throws the slide 111 of the reversing valve 110 into its right-hand position, as shown, and inaugurates a new up-stroke.

It will be apparent, from the foregoing description, that, whereas the needle valves 103 are effective to control the rate of the piston 80 during an up-stroke, the needle valves 102 are effective to control its rate during a down-stroke.

It will further be apparent that the operation of the mechanism comprises a series of alternate up-and-down-strokes, and that since the piston valve 63 within the master cylinder 61 is integrally attached to the piston 80 by means of the connecting rod 70, the piston valve 63 will operate through a corresponding series of up-and-down strokes, and that consequently, since the piston valve 63 is effective to control the operation of the various valves of the water-gas set, the settings of the needle valves 102 and 103 are ultimately effective to control the operation of the water-gas set.

To illustrate this relation, let it be assumed that the piston valve 63 is making an up-stroke and has travelled upward far enough to expose the conduit 35 to the high-pressure zone. The stack valve, the generator blast valve and the carburetter blast valve are all open; in short, a blow period is in progress. The groove 95 of the stem 87 within the timer 62 is now opposite one of the uppermost of the ports 101—just which one being a function of the positions of the ports through which the hydraulic pressure and relief conduits leading to said valve mechanisms enter the master cylinder 61.

Now, since the rate at which the piston 80 and the piston valve 63 travel upward at this point depends upon the orifice area of said port 101, withdrawing the corresponding needle valve 103, by enlarging this orifice area, and thereby causing more rapid efflux of the oil confined within the upper portion 82 of the cylinder 74, will increase the upward rate of stroke of the piston 80 and piston valve 63 at this point, and thus shorten the blow period. The duration of the entire cycle will be shortened an equal amount, unless this is compensated for by adjusting the remaining needle valves.

Moreover, moving any of the needle valves 102 or 103 to entirely close the corresponding port 100 or 101 would interrupt the operation of the piston 80 and piston valve 63 when the corresponding groove 94 or 95 met the particular port that had been thus closed off, and lock the piston 80 and piston valve 63 in that position, until the orifice was re-opened.

It will further be apparent from a comparison of Figs. 1 and 2 that a blow period of the water-gas manufacturing cycle is performed during the last part of an up-stroke and the first part of the next down-stroke of the piston 80 and the piston valve 63, and that consequently a certain number of the uppermost ports 100 and 101 and needle valves 102 and 103 are effective to control the duration of the blow period. Just how many will of course depend on the relative positions of the ports 100, 101 and the ports leading to the operating valve mechanisms from the master cylinder 61. In the present instance it is assumed that the ports and needle valves that serve to control the duration of the blow period of the cycle are those lying above the line 190—190 of Fig. 2.

In my present invention, I accomplish co-ordination of the operation of a plurality of water-gas sets by starting the cycle of operation of each of the sets in a definite, uniform and staggered relation to the cycles of operation of the other sets. Preferably, I provide means for interrupting or delaying the progress of the cycle of each set during an air blow period, and resuming the progress of the cycle by inaugurating the succeeding steam run period in a definite spaced relation to the cycles of operation of the other sets under control.

Such means comprises in part a conduit 200, communicating with a port 100a, which is that one of the ports 100 just above the line 190—190, and consequently the last control port traversed by the groove 94 during the blow period. The conduit passes through the passage 98, preventing direct communication between the port 100a and the passage 98, and terminates in the conduit 146 (or, when desirable from a structural standpoint, in the passage 98). In the conduit 200 is situated a solenoid valve 201 that is normally closed, but which is opened at regular intervals by means of apparatus to be described hereinbelow.

It will thus be apparent that the function of the conduit 200 and the valve 201 is to arrest the progress of the piston 80, and consequently the progress of the cycle of operation of the corresponding set toward the end of the blow period. The blow period continues until the valve 201 is opened, and the groove 94 then descends below the line 190—190, inaugurating an up-run, and in the present terminology, commencing a new cycle of operation.

In order to open the valves 201 of the various water-gas sets in a definite relation and in predetermined sequence, I provide a central control device 210 that is shown in Figs. 3, 4, 5, 6 and 7. Said central control device 210 is adapted to open the various solenoid valves 201 of a plurality of automatic control devices 60 that correspond to and operate a corresponding plurality of water-gas sets.

Figures 4, 5:
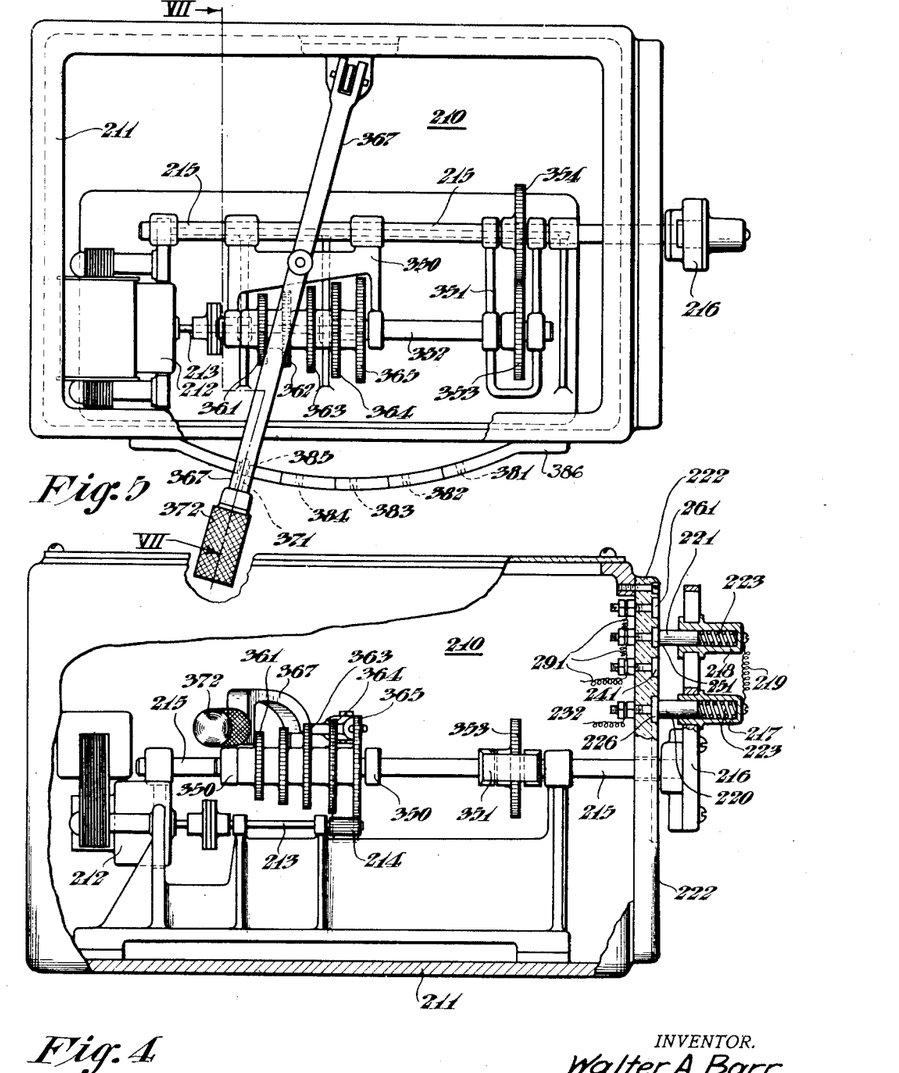
Fig. 4 is a side elevational view, partly in vertical section, of the central control device of Fig. 3.
Fig. 5 is a plan view, partially in horizontal section, of the device shown in Figs. 3 and 4, with its cover removed.

The various parts of the control device 210 are conveniently mounted and enclosed in a box 211. Within the box 211 is situated a clock mechanism 212 that is preferably an electrically-operated synchronous clock adapted to rotate a constant-speed shaft 213 at a speed of one revolution per minute, when operated from a standard alternating-current supply of 60 cycles per second. The shaft 213 is provided at its opposite end with a pinion gear 214, which in the present instance is provided with twelve teeth.

The purpose of the clock 212 and the shaft 213 are to drive at a uniform speed a shaft 215, having mounted on one end thereof an arm 216, preferably of non-conducting material. Upon the arm 216 are mounted a pair of metal sleeves 217 and 218 that are connected by a flexible connection 219. The sleeves 217 and 218 contain a pair of carbon brushes 220 and 221 that are slidably mounted therein, and which are caused to bear against metal contact surfaces flush with the surface of the face 222 of the box 211 by springs 223. The face 222 is made of non-conducting material.

The sleeve 217 is fixed in the arm 216, but the sleeves 218 may be moved through the length of a slot 224 in the arm 216, and may be held in any desired position, as will be shown below, by means of a set screw 225, which bears against the surface of the arm 216.

The brush 220 always remains in contact during its travel around the shaft 215 with an annular contact ring 226 mounted flush in the box 211.

Figure 3:
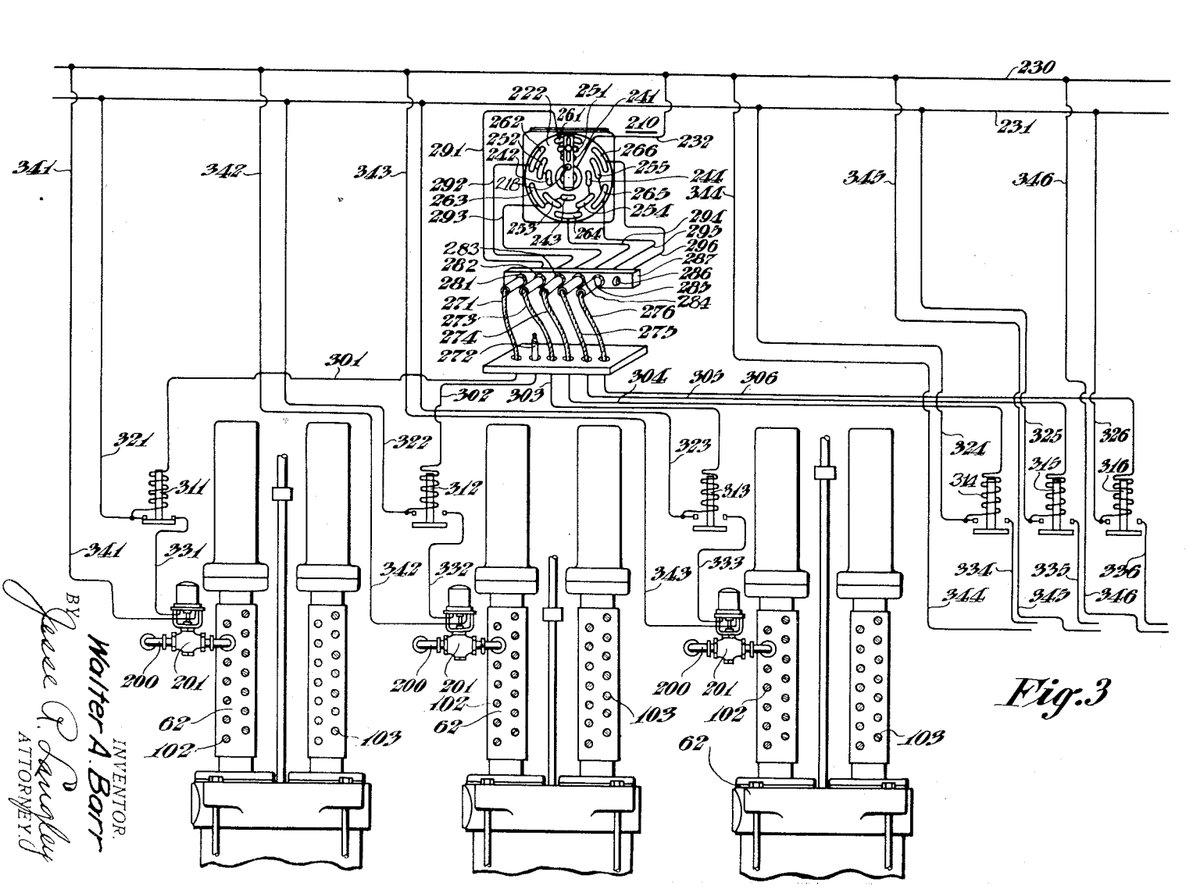
Fig. 3 is a more or less diagrammatic elevational view of a plurality of such controlling means and of a central control device for effecting uniform control of the same.

Electric current is supplied from a general source comprising a pair of lines 230 and 231. The annular contact ring 226 is connected to the line 230 by a lead 232.

Figure 6:
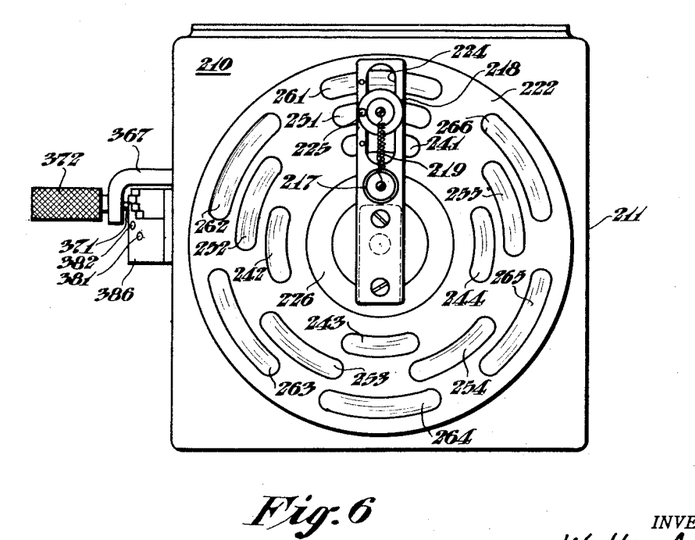
Fig. 6 is an end elevational view of the device shown in Figs. 3, 4 and 5.

There are also provided a plurality of individual contact members, similarly flush in the face 222 of the box 211, and arranged concentrically around the shaft 215. In the present instance, wherein the total number of gas-making units controlled is six, there are preferably provided three sets of such individual contacts. The first set, comprised of four contacts 241, 242, 243 and 244 is arranged adjacent to the annular contact 226; in a somewhat larger circle is arranged a second set of five contacts 251, 252, 253, 254 and 255, while a third set of six contacts 261, 262, 263, 264, 265 and 266 is arranged in a circle of still larger diameter. These various contacts are equally spaced in their respective circles and are of equal size with respect to the rotation of the arm 216, that is, they correspond to equal arcs of the circle. By means of the set screw 225, the sleeve 218 may be secured in such position in the slot 224 that the brush 221 registers with any one of the three outer contact circles. In Figs. 3, 4 and 6 the brush 221 is set in the sleeve 218 opposite the intermediate contact circle comprising the five contacts 251, 252, 253, 254 and 255.

For selectively controlling the number of units operated by the central control device 210, I provide a set of six "jumpers", that are preferably constituted of six flexible plug connections 271, 272, 273, 274, 275 and 276, and six jacks 281, 282, 283, 284, 285 and 286 in a panel 287 opposite the flexible plug connections, and so arranged that any of the latter, for example the plug 276, may be inserted in any of the jacks, for example the jack 281.

The contacts 241, 251 and 261 are connected to the first jack 281 by means of a line 291; the contacts 242, 252 and 262 to the second jack 282 by a line 292; the contacts 243, 253 and 263 to the third jack 283 by a line 293; the contacts 244, 254 and 264 to the fourth jack 284 by a line 294; the contacts 255 and 265 to the fifth jack 285 by a line 295; and the contact 266 is connected to the sixth jack 286 by a line 296. The plugs 271, 272, 273, 274, 275 and 276 are connected by means of corresponding leads 301, 302, 303, 304, 305 and 306 to the coils of a plurality of relays 311, 312, 313, 314, 315 and 316 that are in turn connected to the line 231 by means of a plurality of leads 321, 322, 323, 324, 325 and 326. Each lead is connected both to the coil of the corresponding relay and to one of the contact terminals, and the latter are in turn connected to the terminals of solenoid valves 201 by a plurality of leads 331, 332, 333, 334, 335 and 336. The other terminals of the solenoid valves 201 are connected to the line 231 by means of a plurality of leads 341, 342, 343, 344, 345 and 346.

In Fig. 3, only three of the control timing devices 62, with their solenoid valves 201, have been shown, but the leads 334, 335, 336, 344, 345 and 346 are in reality connected to the other three solenoid valves of the series on the control devices of three more water-gas sets, making six in all, and corresponding to the six plugs 271, 272, 273, 274, 275 and 276.

As hereinabove recited, in the operation of a plurality of water-gas manufacturing units, it frequently happens that one or more of such units is shut down for some reason, such as to remove clinker from the generator, or to rechecker the carburetter or superheater, or for any other repairs. Such interruptions are more or less frequent in practice. Moreover, it may be desired at any time to reduce the number of units being operated, for the purpose of reducing the total gas make of the whole, or for any other reason.

By means of the devices hereinabove described, I provide for operating any member of a plurality of gas-making units in a uniform and coordinated relation to each other in point of time, irrespective of how many of such units may actually be operating at one time. That is, in the present instance, in which a maximum of six units may be controlled so as to go through their respective gas-making cycles in uniform sequence, uniform operation may also be had if only five, or four, or even less, of the units are being operated at any time.

For example, let it be assumed that the unit corresponding to the second timing mechanism 62 from the left of Fig. 3 is idle, and the remaining five units are to be operated. The brush 222 is set to travel over the intermediate circle of five contacts 251, 252, 253, 254 and 255. The plug 272, corresponding to the idle unit, is left in its lower position, and the five remaining plugs 271, 273, 274, 275 and 276 are inserted in the first five jacks 281, 282, 283, 284 and 285. In this manner, communication is established between the five relays 311, 313, 314, 315 and 316 and the contacts 251, 252, 253, 254 and 255, respectively.

In Fig. 3, this situation is depicted. The sleeve 218 for the carbon brush 221 is shown in position for contact of its brush 221 with the contact 251. Current now flows from the line 230, through the line 232, thence, as shown in Fig. 4, through annular contact 226, brush 220, sleeve 217, connection 219, sleeve 218, brush 221, contact 251, thence, as shown in Fig. 3, to line 291, jack 281, flexible plug-connection 271, line 301, the coil of the relay 311, and line 321 to the line 231. As the relay 311 is now energized, it closes its contact element, and current also flows from the line 230 through line 341, the first solenoid valve 201 from the left of Fig. 3, line 331, and line 321 to the line 231. The first solenoid valve 201 is thus open.

It will be apparent that as the arm 216 rotates through 360° in a counter-clockwise direction at a uniform rate, the brush 221 will successively engage the contacts 252, 253, 254, 255 and then 251 again, at equal intervals of time. As each contact is encountered, the corresponding relay closes, and the corresponding solenoid valve opens, allowing the corresponding piston 80 and piston valve 63 to move downward, and inaugurating a steam run period and a new cycle in the corresponding gas-making unit. The five units will thus commence their respective cycles at equal intervals of time and in a definite sequence.

If all six units are to be in operation at one time, the brush 222 is set on the outer circle of six contacts, and the six plugs are inserted in the corresponding six jacks. It is not necessary, however, that each plug, for example 271, be inserted in the oposite jack, for example, 281, but the various plugs may be inserted in the various jacks in any order and the order of operation of the various units may thus be varied at will.

If only four of the six units are to be operated at the same time, the corresponding four plugs, for example, plugs 272, 273, 275 and 276 are inserted in the first four jacks 281, 282, 283 and 284, and the brush 222 is set in the inner circle of four contacts 241, 242, 243 and 244. The four operating units are thus controlled in equally spaced relation to each other.

If only three of the six units are to be operated at the same time, the three corresponding plugs, for example plugs 271, 272, and 273, are placed in the jacks 281, 283 and 285 and the brush 222 is set on the outside circle of six contacts. In this instance, only the contacts 261, 263 and 265 will function.

It is even possible to operate two units in uniform sequence by a similar arrangement, and of course, a larger number of units may be controlled by a central control device with a corresponding number of contacts, and a corresponding number of plugs and jacks.

As it is occasionally desirable, for a number of reasons, to change the length of the cycle of operation of a water-gas set, or to change the ratio of air blast to steam, I provide means whereby the contacts 241, 242, 243, 244, 251, 252, 253, 254, 255, 261, 262, 263, 264, 265 and 266 may be closed at any desired rate, and in the present instance, I show and describe means whereby these may be closed at any one of five rates, which may be selected at the will of the operator, and which serve to effect operating cycles, the duration of which are four minutes, four and one-half minutes, five minutes, five and one-half minutes, and six minutes, respectively.

Such means comprises, in brief, a series of selective reduction gears whereby the speed of rotation of the arm 216 and brush 222 may be varied over a correspoding range. A yoke 350 is slidably and idly mounted upon the shaft 215 and, together with a further yoke 351, idly but not slidably mounted upon the shaft 215, serves to support an intermediate drive shaft 352, to which the yokes 350 and 351 are similarly attached. The shafts 352 and 215 are operatively connected by means of gears 353 and 354, of equal pattern, so that rotation of the shaft 352 causes rotation of the shaft 215 at the same rate.

The yoke 350 also carries a series of five graduated gears 361, 362, 363, 364 and 365, slidably keyed to the shaft 352. A comparison of the number of teeth of each of these gears with the correspoding length of cycle (i. e., the time required for one revolution of the shaft 215 and arm 216) is as follows, it being remembered that the pinion 214 has twelve teeth and rotates at a speed of one revolution per minute:

| Gear | Number of teeth | Length of cycle |
|---|---|---|
| 361 | 48 | 4 minutes. |
| 362 | 54 | 4 minutes and 30 seconds. |
| 363 | 60 | 5 minutes. |
| 364 | 66 | 5 minutes and 30 seconds. |
| 365 | 72 | 6 minutes. |

These gears 361, 362, 363, 364 and 365 may be removed and replaced by other gears of different size, whenever it is desirable to do so.

Figure 7:
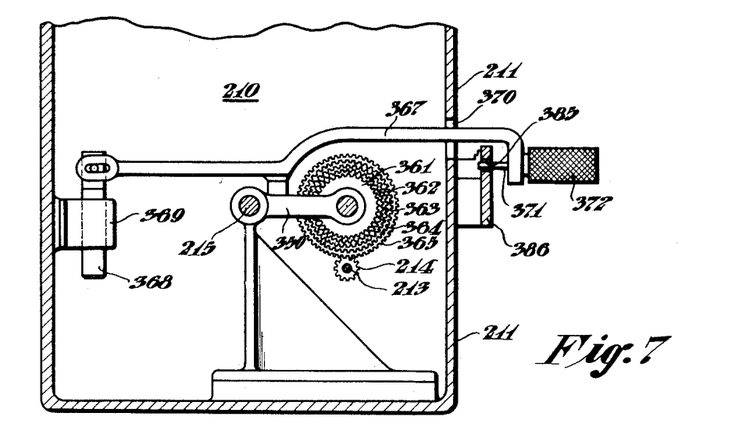
Fig. 7 is a vertical sectional view of the device shown in Figs. 3, 4, 5 and 6, taken along the line 7—7 of Fig. 5.

The yoke 350 is rigidly attached to an arm 367. One end of the arm 367 is loosely and slidably connected to a weight 368 that is of cylindrical shape and is loosely positioned by a collar 369 attached to the side of the box 211. The opposite end of the arm 367 protrudes through a slot 370 and is provided with a movable pin 371 that may be somewhat withdrawn by means of a handle 372 against the action of a concealed spring. The plug 371 may be inserted in any one of a series of five holes 381, 382, 383, 384 and 385, in a strap 386 that is curved in accordance with the travel of the arm 367 and pin 371.

The holes 381, 382, 383, 384 and 385 are so arranged that when the pin 371 is inserted in hole 381, the gear 361 is in mesh with the pinion 214; whereas, when the pin 371 is moved to and inserted in the hole 382, the gear 362 is in mesh with the pinion 214 and so on. In the drawings, the pin 371 is shown inserted in the hole 385, and the gear 365 is in mesh with the pinion 214. The shaft 215 and arm 216 are now rotating at a speed of one revolution in six minutes, which means that successive moments of contact between the brush 222 and any one of the contacts of that circle on which the brush 222 is set will be six minutes apart, and that the cycle of operation of the various water-gas sets under control is six minutes long.

Figure 8:
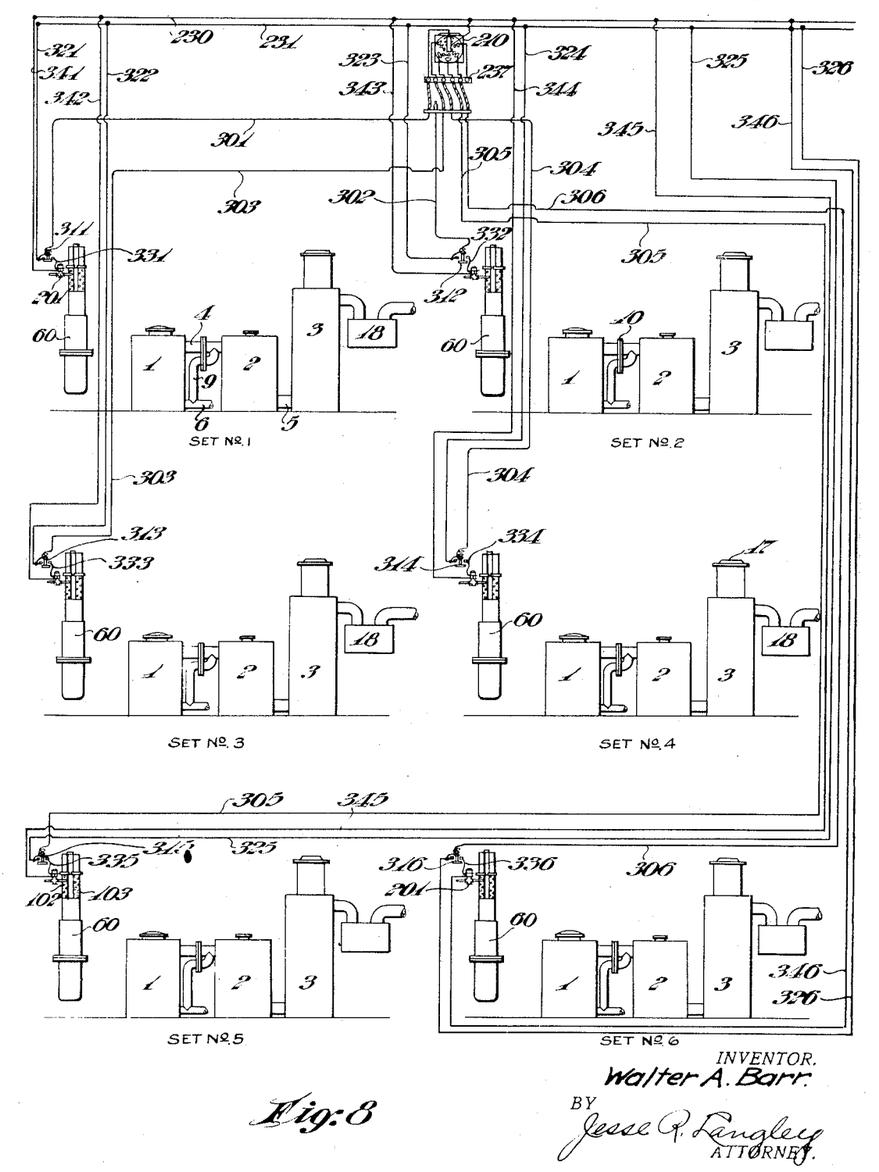
Fig. 8 is a more or less diagrammatic elevational view of a plurality of carburetted water gas sets, individual controlling means therefor, and a central control device for effecting uniform control of the same.

The relation of the central control device 210 to the several sets and the individual controls therefor is clearly shown in Fig. 8. In the drawings, the connections between the individual controls and the sets respectively operated by the same are omitted for the sake of clarity, these being the same as are shown, for example, in Fig. 1.

The function of the control device 210 in effecting uniform operation of the six water-gas sets is best understood in comparison with a particular cycle of operation.

In the present instance, the speed of rotation of the arm 216 may be set at various speeds ranging from one revolution in four minutes to one revolution in six minutes. The following cycle of operation may be taken as typical:

(a)

```
Run:                                  Seconds
    Up-run (first) ___________________  60
    Down-run _________________________ 100
    Up-run (second) __________________  20
Blow _________________________________ 120
                                      ─────
    Length of entire cycle ___________ 300
                                  or 5 minutes
```

When this cycle is to be performed, it is preferred to set the timing devices 62, by adjusting the needle valves 102 and 103, so that, so far as the timing device 62 is concerned, the cycle that would be performed by the machine, irrespective of any delay which may take place as the grooves 94 encounter the ports 100a at such time as the solenoid valve 201 is closed, is as follows:

(b)

```
Run:                                  Seconds
    Up-run (first) ___________________  60
    Down-run _________________________ 100
    Up-run (second) __________________  20
Blow _________________________________  60
                                      ─────
    Length of entire cycle ___________ 240
                                  or 4 minutes
```

The arm 367 of the central control device 210 is moved so that the plug 371 may be and is inserted in the hole 383, so that gear 363 is in mesh with pinion 214, and the arm 216 makes one revolution in five minutes. In other words, the interval between successive openings of any one of the solenoid valves 201 is five minutes.

However, four minutes after any one of the valves 201 has opened and allowed the corresponding timing device 62 to proceed into the run period of the operating cycle of its corresponding water-gas unit, the groove 94 encounters the port 100a, egress of liquid from which is prevented by the then closed solenoid valve 201.

The piston 80 of the timing device 62 then remains stationary for one minute, at which time the arm 216 completes one revolution the solenoid valve 201 opens, and a new cycle is inaugurated. The actual cycle performed by the water-gas unit, is, therefore, cycle (a) above, of five minutes duration. Of the 120 second blow, 60 seconds are controlled by the setting of the timing device 62 and the remaining 60 seconds are effected by the central control device 210.

In this instance, if all six units are operating, the various units commence their cycles at fifty second intervals. That is, the run period of the second unit is inaugurated fifty seconds after the commencement of the run period of the first unit, and so on. This follows from the fact that the brush 222, in one revolution requiring five minutes for completion, engages the six contacts 261, 262, 263, 264, 265 and 266 at equal intervals. Moreover, in this instance, with six water-gas units controlled by the timing device 210 which is set for a five-minute cycle, a comparison of the cycles of the various units shows that at any time no less than three nor more than four of the six units are making water gas. The total gas make of the six units is, therefore, much more uniform than has been possible in the prior art.

If, however, only five units are operating, the brush 222 being set accordingly, the various units commence their respective run periods at intervals of sixty seconds, as the brush 222 now engages the five contacts 251, 252, 253, 254 and 255 at equal intervals during one revolution requiring five minutes for completion.

When it is desired to change the length of cycle, the yoke 350 is moved to change the setting of the central control device 210. For example, moving the handle 372 to the point where the pin 371 may be and is inserted in the hole 385 causes the brush 222 to slow down to one revolution in six minutes. This causes the timing devices 62, after the completion of the four minute cycle for which they are set, to delay for two minutes, and the following cycle is thereby performed.

(c)

| Run: | Seconds |
|---|---|
| Up-run (first) | 60 |
| Down-run | 100 |
| Up-run (second) | 20 |
| Blow | 180 |
| Total length of cycle | 360 |
| | or 6 minutes |

In this instance, assuming all six units to be operating, the number of units making water gas at any time is always three, and the gas make is substantially uniform.

On the other hand, the central control device 210 may be set for a four-minute cycle, and this being the cycle for which the timing devices 62 are set, there will be no delay after the completion of the cycle performed by the timing devices 62 per se, and the actual cycle performed will be cycle (b) above of four minutes duration. In this instance, assuming six sets are being operated, no less than four and no more than five units are making water gas at any time.

The central control device 210, as above recited, may also be set to effect operating cycles of four and one-half minutes and of five and one-half minutes duration. Still other cycles may be obtained by replacing the gears 361, 362, 363, 364 and 365 by gears of other and appropriate sizes.

It will be apparent that the difference between the various cycles hereinabove set forth is obtained by delaying the movement of the timing devices 62 for any desired length of time, and that the effect of this is not to change the amount of steam per cycle, but to vary the amount of air blast per cycle by increasing the length of the blow period, and consequently effecting a variation of the air-steam ratio. This may of course be modified by changing the settings of the timing devices 62, for example, to give, if uninterrupted, the following cycle:

(d)

| Run: | Seconds |
|---|---|
| Up-run (first) | 80 |
| Down-run | 120 |
| Up-run (second) | 30 |
| Blow | 70 |
| Length of this cycle | 300 |
| | or 5 minutes |

Whereas, the duration of the actual cycle performed may be extended to six minutes by setting the central control device 210, to give the following actual cycle performed by the units.

(e)

| Run: | Seconds |
|---|---|
| Up-run (first) | 80 |
| Down-run | 120 |
| Up-run (second) | 30 |
| Blow | 130 |
| Length of total cycle | 360 |
| | or 6 minutes |

It will be apparent to those skilled in the art that many other cycles and variations are possible with this device, but that in each instance the operation of the several units is carried out in regular and uniform sequence, and the gas make is more uniform than has heretofore been possible.

Moreover, the term "water-gas units" as used herein is not confined to a single water-gas set, but may also include a plurality of such sets. For example, the relay 311, instead of being connected to a single solenoid valve 201 corresponding to a single water-gas set, as shown in Fig. 3, may be connected to a plurality of, for example, three solenoid valves, with a corresponding number of water-gas sets. With the other relays similarly connected, the central control device 210 would be effective to control and synchronize the operation of six units, each consisting of three water-gas sets, or a total of eighteen water-gas sets in all. Such large installations have been proposed for the manufacture of blue water gas for certain chemical processes.

It will further be apparent that variation of the number of units in operation does not affect the length of cycle performed by each unit, and vice versa.

I thus provide means for operating a plurality of water-gas manufacturing units in a definite and uniform sequence, that may be readily and conveniently adjusted to minimize the effect produced when one or more of the plurality of units is not in operation, and to provide for varying the length of the operating cycle of the units at will.

My invention is not limited to the specific devices and examples hereinabove set forth by way of illustration, but may variously be embodied within the scope of the claims hereinafter made.

I claim as my invention:

1. In apparatus for making water gas, the combination of two or more water gas sets each including a water gas generator and a heat interchange vessel with valves thereon and each adapted for operation in a cycle of air blasting and water gas making, an automatic control machine for each set adapted to cause it to operate in a cycle, and a master automatic machine for starting the automatic machines appertaining to the respective sets in predetermined sequence.

2. In apparatus for making water gas, the combination of two or more water gas sets each including a water gas generator and a heat interchange vessel with valves thereon and each adapted for operation in a cycle of air blasting and water gas making, an automatic control machine for each set adapted to cause it to operate in a cycle, and a master automatic machine for starting the automatic machines appertaining to the respective sets in predetermined sequence and for putting out of service any automatic control machine which gets out of step with the other automatic control machine or machines.

3. In apparatus for making water gas, the combination of two or more water gas sets each including a water gas generator and a heat-interchange vessel with valves thereon and each adapted for operation in a cycle of air blasting and water gas making, an individual automatic control machine for each set adapted to cause it to operate in a cycle, but ineffective of itself to cause the corresponding set to pass from one cycle to another, and a master automatic machine for starting the individual automatic machines and inaugurating new cycles in the respective sets appertaining thereto in predetermined sequence.

4. In apparatus for making water gas, the combination of two or more water gas sets each including a water gas generator and a heat-interchange vessel with valves thereon and each adapted for operation in a cycle of air blasting and water gas making, an individual automatic control machine for each set adapted to cause it to operate in a cycle, means for arresting the progress of each individual automatic control machine at a predetermined point with respect to the cycle of operation of the corresponding water gas set, and a master automatic machine for starting the individual automatic machines in predetermined sequence.

WALTER A. BARR.